US006343799B1

(12) United States Patent
Moyer

(10) Patent No.: US 6,343,799 B1
(45) Date of Patent: Feb. 5, 2002

(54) TILT MECHANISM FOR WORK MACHINE

(75) Inventor: William J. Moyer, Maple Grove, MN (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/630,126

(22) Filed: Aug. 1, 2000

(51) Int. Cl.[7] ........................................ B60G 17/00
(52) U.S. Cl. .............................. 280/6.154; 180/89.14
(58) Field of Search ........................ 180/89.14, 89.15, 180/89.13; 280/6.154, 6.15

(56) References Cited

U.S. PATENT DOCUMENTS

| | | | | |
|---|---|---|---|---|
| 4,326,571 A | | 4/1982 | Crawford | |
| 4,565,486 A | | 1/1986 | Crawford et al. | |
| 4,650,017 A | * | 3/1987 | Pelletier et al. | 280/6.154 |
| 4,679,803 A | * | 7/1987 | Biller et al. | 280/6.154 |
| 4,823,852 A | * | 4/1989 | Langford | 180/89.14 |
| 4,991,673 A | * | 2/1991 | Ericsson | 180/41 |
| 5,337,847 A | | 8/1994 | Woods et al. | |
| 6,135,225 A | * | 10/2000 | Barsic | 180/89.14 |
| 6,158,539 A | * | 12/2000 | Isley | 180/89.14 |
| 6,173,973 B1 | * | 1/2001 | Robinson | 280/6.154 |
| 6,241,263 B1 | * | 6/2001 | Hicks | 280/6.154 |

FOREIGN PATENT DOCUMENTS

| | | |
|---|---|---|
| CA | 1 191 429 | 8/1985 |
| CA | 1 201 644 | 3/1986 |

OTHER PUBLICATIONS

ASN 09/277,919 filed Mar. 29, 1999 entitled Work Machine Having a Tilt Mechanism for Supporting an Upper Frame Thereof.

ASN 09/347,599 filed Jun. 30, 1999 entitled Tilt Mechnism for Supporting a Cab Assembly of a Work Machine and an Associated . . . .

* cited by examiner

*Primary Examiner*—Robert J Oberleitner
*Assistant Examiner*—Marlano Sy
(74) *Attorney, Agent, or Firm*—Liza J. Myers

(57) ABSTRACT

A work machine having a tilt mechanism for tilting the working body of the machine relative to the base frame is disclosed. An embodiment includes a support tilt frame, a center tilt frame, an upper tilt frame, and a coupling mechanism. The coupling mechanism includes a variable-length pitch support member, a pitch pivot link, and a roll support member. When tilting is desired, the pitch support member is actuated to move the pitch pivot link and, by extension or retraction, the roll support member. The roll support member is pivotally connected to the upper tilt frame and movement of the roll support member causes the upper tilt frame to move in a pitch or roll direction due to pitch and roll pivoting joints.

12 Claims, 3 Drawing Sheets

TILT MECHANISM FOR WORK MACHINE

TECHNICAL FIELD

The present invention relates generally to work machines, and more particularly to work machines having a tilt mechanism for tiltably supporting a working body position relative to a ground engaging, running gear portion.

BACKGROUND ART

Since work machines such as track-type swing machines for forestry applications are often used off-road on uneven terrain, the frame and thus the working body may not be horizontal relative to the horizon when the work machine is located in a work performing position. It is highly desirable, however, for the comfort of the operator and for the most efficient functioning of the work machine that the working body be horizontal during work machine operation. Accordingly, it is useful to equip track-type swing machines with a tilting mechanism such that the operator can maintain the working body horizontal even when the frame of the work machine is inclined at an angle relative to the horizon.

In addition, the tilt mechanism allows the operator to tilt the working body such that the work machine is more capable of maneuvering in close quarters, for example, maneuvering between rows of trees which are positioned close together.

An example of a currently used tilt mechanism is shown in U.S. Pat. No. 5,337,847, issued Aug. 16, 1994 to Woods et al. (hereafter referenced as '847). '847 discloses a four-way leveling mechanism which uses a spherical bearing mounted on a shaft and vertical hydraulic cylinders to accomplish the tilt function. This type of tilt mechanism causes the work machine to have a high center of gravity due to the operating clearance needed for the vertically mounted hydraulic tilt cylinders, causing operator discomfort and fatigue. This operating clearance also lowers the ground clearance for the work machine. In uneven terrain often encountered by these work machines, high ground clearance helps prevent damage to the work machine often caused by stumps and other ground-resident debris. The low ground clearance and high operating clearance of the prior art can combine to make maintenance and servicing more difficult, as well. The tilt cylinders may be subject to high shock and moment forces due to their arrangement relative to the pivot point of the tilt mechanism of the machine.

The present invention is directed to overcoming one or more of the problems as set forth above.

DISCLOSURE OF THE INVENTION

In one aspect of the present invention, a work machine is disclosed having a base frame, a track assembly, a support tilt frame, a center tilt frame, an upper tilt frame, a working frame, and a coupling mechanism. The coupling mechanism includes a pitch support member, a roll support member, and a pitch pivot link. The pitch support member connects one of the tilt frames and the pitch pivot link, and the roll support member connects the pitch pivot link and another of the tilt frames.

BEST MODE FOR CARRYING OUT THE INVENTION

Work machines, such as track-type swing machines, have achieved wide acceptance in the construction and forest industries. Such work machines typically employ a crawler-type track assembly to provide machine mobility over uneven terrain, a frame attached to the track assembly, and a work implement supported by the frame. These work machines also include an engine, a hydraulic system to operate many of the moving parts of the work machine such as the work implement, and a working body supported by the frame. An operator is typically positioned within a cab assembly comprising part of the working body to operate the controls of the work machine.

Figure 1:
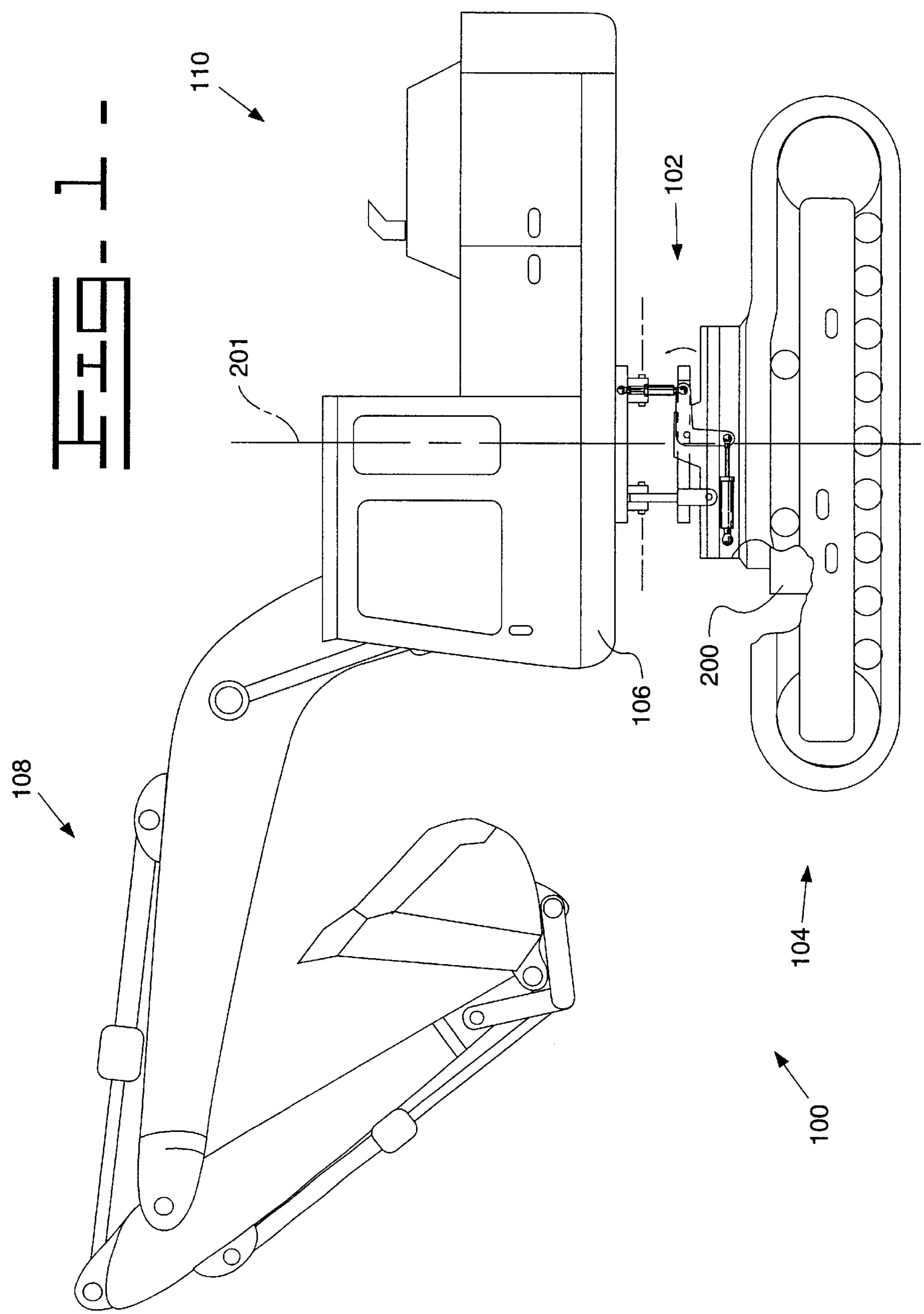
FIG. 1 is a side view of a work machine incorporating an embodiment of the present invention.
Figure 2:
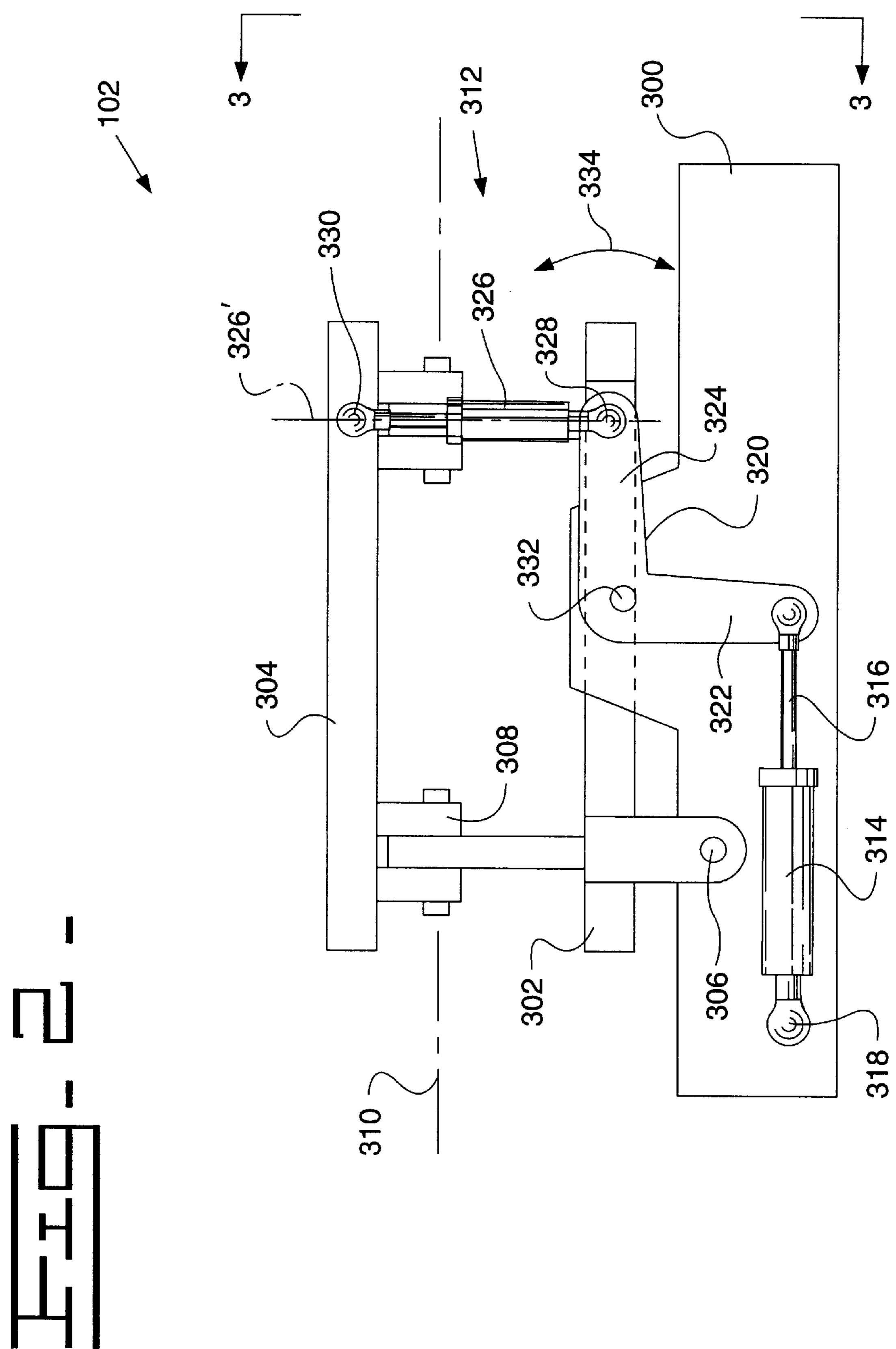
FIG. 2 is a side view of an embodiment of one portion of the present invention.

Referring to FIGS. 1 and 2, a work machine 100 is shown that includes a tilt mechanism 102. The work machine 100 includes a track assembly 104, generally known to comprise tracks, rollers, track pins, and the like; a working frame 106; a work attachment shown generally as 108; a working body shown generally as 110; and a base frame 200, generally known to comprise a car body, track roller frame weldments, and the like. The track assembly 104 is attached to the base frame 200. A swing bearing (not shown) is located between the tilt mechanism 102 and the working frame 106 to permit relative rotation therebetween about swing axis 201.

The tilt mechanism 102 is shown in greater detail in FIG. 2 and includes a support tilt frame 300, a center tilt frame 302, an upper tilt frame 304, and a coupling mechanism 312. The support tilt frame 300 is attached to the base frame 200. At least one pitch pivoting joint 306 connects the support tilt frame 300 and the center tilt frame 302. At least one roll pivoting joint 308 connects the center tilt frame 302 and the upper tilt frame 304 and defines a roll axis 310.

Figure 3:
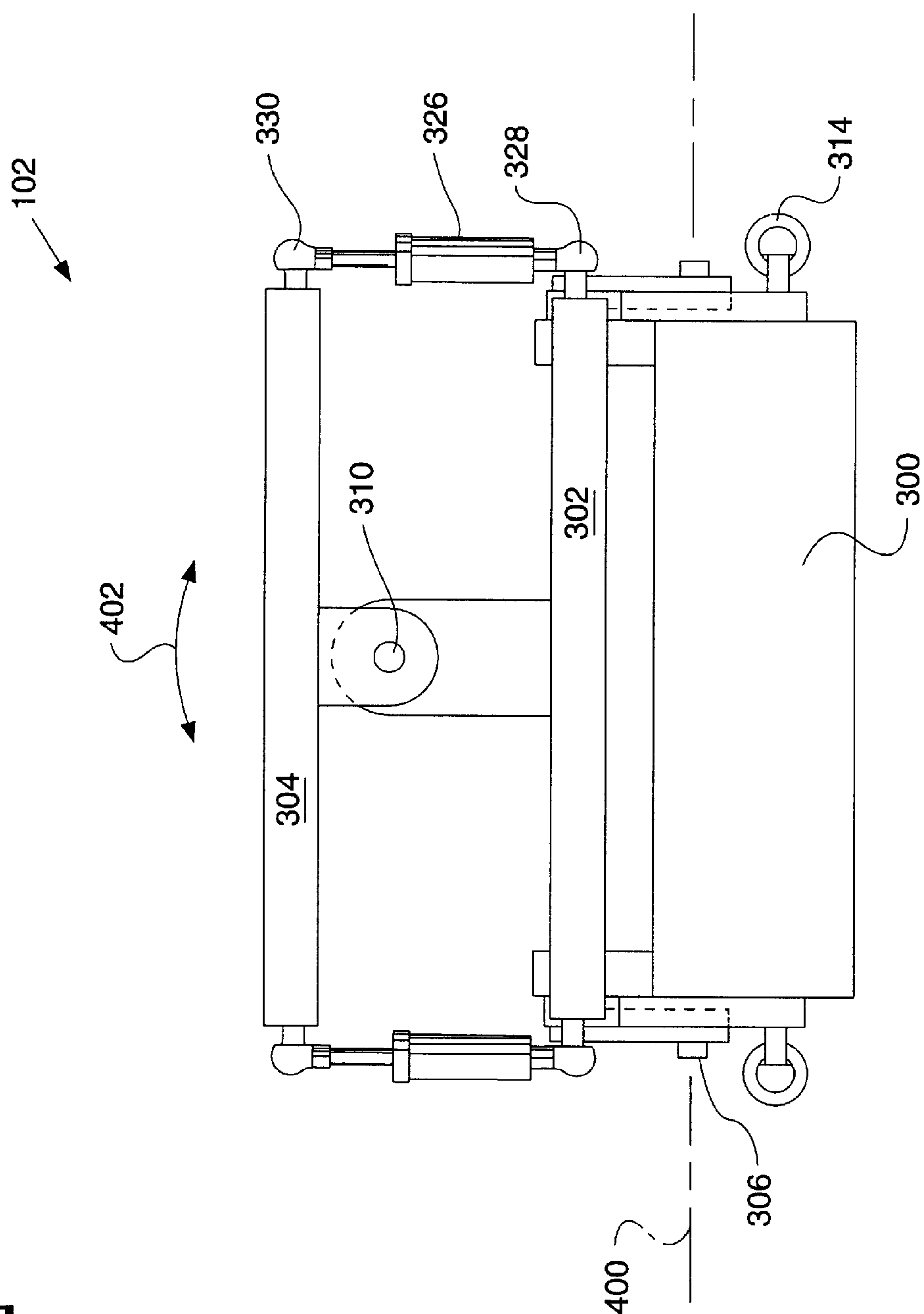
FIG. 3 is an elevational view of the embodiment portion taken along line 3—3 of FIG. 2.

The coupling mechanism 312 provides motive force to the tilt mechanism frames 300, 302, 304. The coupling mechanism 312 includes a pitch support member 314 having a first portion 316 and a second portion 318, a pitch pivot link 320 having a first end 322 and a second end 324, and a roll support member 326 having a first section 328 and a second section 330. While FIG. 2 shows one coupling mechanism 312, it is to be understood that a mirror-image coupling mechanism 312 may be disposed on the other side of the tilt mechanism 102, as best shown in FIG. 3, with certain advantages attendant to such dual coupling mechanisms as opposed to use of a single coupling mechanism. Only one coupling mechanism 312 will, however, be described in detail below.

Elements of the coupling mechanism 312 are preferably attached to the tilt mechanism frames through connecting fixtures such as, but not limited to, ball joints or swivel hitches. The connecting fixtures should, ideally, allow universal-type motion about more than one axis; for instance, side-to-side as well as front-to-back motion. Any such connecting fixture will be hereafter referenced as a pivot joint or a pivotal connection/attachment.

The pitch support member 314 preferably comprises a hydraulic cylinder or other variable-length member. The second 318 and first 316 portions of the pitch support member 314 are pivotally connected to the support tilt frame 300 and to the first end 322 of the pitch pivot link 320, respectively.

The pitch pivot link 320 is preferably connected to the support tilt frame 300 at a center pivot point 332 about which the first end 322 and second end 324 are free to rotate. The pitch pivot link 320 is best shown in FIG. 2 as having a right-angle shape, but it should be appreciated that other shapes may be employed without departing from the scope of the invention as defined by the claims. The center pivot point 332 need not be located in the center of the pitch pivot link 320, either, to permit the present invention to operatively achieve its objectives.

The roll support member 326 is shown in the FIGS. as a hydraulic cylinder but could be either a fixed-length strut or a variable-length member. The first section 328 is pivotally connected to the second end 324. The second section 330 is pivotally connected to the upper tilt frame 304.

Referring to FIG. 3, the pitch pivoting joint 306 defines a pitch axis 400. The pitch pivoting joint 306 permits rotation of the center tilt frame 302 and by extension the upper tilt frame 304 about the pitch axis 400 in a pitch direction 334. The roll pivoting joint 308 allows rotation of the upper tilt frame 304 about the roll axis 310 in a roll direction 402.

Industrial Applicability

In operation, when the work machine 100 is on uneven terrain resulting in the working body 110 being at an angle relative to the horizon, it is desirable for the working body 110 to be leveled, or tilted relative to the base frame 200. The operator or an automated system controls the tilt mechanism 102 to provide this leveling. The tilt mechanism 102 uses hydraulic or other well-known power sources. The operation of the tilt mechanism 102 will be discussed using two mirror-image coupling mechanisms 312 on either side of the tilt mechanism 102, but it is readily apparent that a single coupling mechanism 312 may also provide the needed operational functionality of the present invention.

When an operator commands motion of the tilt mechanism in a strictly pitch direction 334, it is to be understood that the same motions occur in both of the tilt and coupling mechanisms 102,312. The pitch support member 314 extends or retracts, thus pushing or pulling the pitch pivot link 320 to rotate about the center pivot point 332 while the second end 324 causes the roll support member 326 to move approximately longitudinally in the direction 326'. The roll support member 326 may be either a fixed or variable length member for accommodating pure pitch operation, as such an operation requires no change in roll support member 326 length. As the roll support member 326 moves in the direction 326', the upper tilt frame 304 and by extension the center tilt frame 302 rotate about the pitch axis 400 to provide motion in only the pitch direction 334.

Upon an operator command to perform a leveling motion in a strictly roll direction 402, the motion is induced in one of two ways, depending upon the characteristics of roll support members 326. If the roll support members 326 are hydraulic cylinders or other variable length members, one of the roll support members 326 extends while the other of the roll support members 326 retracts, causing the upper tilt frame 304 to rotate solely in a roll direction 402 about the roll axis 310. If the roll support members 326 are of a fixed length, one of the pitch support members 314 extends while the other pitch support member 314 retracts, thus causing the roll support members 326 to move substantially longitudinally as previously discussed, although in opposing directions. This causes the upper tilt frame 304 to rotate about the roll axis 310 in a purely roll direction 402.

It should be appreciated that different combinations of extension and retraction of the pitch support members 314 and of the roll support members 326, should they be variable-length members, can cause desired combinations of motions in both pitch and roll directions about a multiaxis pivot point to achieve level orientation of the upper frame 304. The operator or an automated system can control these combinations of motion to permit the working body 110 to be leveled relative to the base frame 200 on uneven terrain without requiring the work machine 100 to assume a predetermined position relative to the slope of the terrain. In addition, the use of horizontally oriented hydraulic cylinders in the coupling mechanism 312 may allow for higher ground clearance of the work machine 100 while lowering the center of gravity thereof to provide a more comfortable position for the operator and better maintenance and service access, since the length of those cylinders need no longer be accommodated in the vertical height of the tilt mechanism 102. Stresses and moments on the elements of the tilt mechanism 102 may also be lowered with the more compact arrangement facilitated by the pitch pivot link 320 and the horizontally oriented coupling mechanism's hydraulic cylinders.

The present invention uses a tilt mechanism to level the working body of a track-type swing machine relative to the ground. The tilt mechanism operates in a gimballed manner through an assembly of frames connected with support members. The support members can be hydraulic cylinders and supply motive force to the frames to provide the leveling function.

Other aspects, objects, and advantages of this invention can be obtained from a study of the drawings, the disclosure, and the appended claims.

What is claimed is:

1. A work machine, comprising:

a base frame;

a track assembly attached to the base frame;

a support tilt frame supported by the base frame;

a center tilt frame supported by the support tilt frame;

an upper tilt frame supported by the center tilt frame;

a working frame supported by the upper tilt frame; and a coupling mechanism having a pitch support member, a roll support member, and a pitch pivot link, the pitch support member having a first portion and a second portion pivotally connected to one of the tilt frames, the roll support member having a first section and a second section pivotally connected to another of the tilt frames, the pitch pivot link being pivotally joined to the one tilt frame and to the first section and first portion, the tilt frames being pivotally connected about a pitch axis and a roll axis.

2. The work machine, as set forth in claim 1, wherein the pitch support member comprises a hydraulic cylinder and has a longitudinal axis which is oriented substantially parallel with the roll axis.

3. The work machine, as set forth in claim 1, wherein the pitch pivot link having a first end, a second end, and a center pivot point, and being pivotally secured to the one tilt frame to enable the first end and the second end to rotate about the center pivot point.

4. The work machine, as set forth in claim 3, wherein the first portion of the pitch support member being pivotally attached to the first end of the pitch pivot link.

5. The work machine, as set forth in claim 3, wherein the first section of the roll support member being pivotally attached to the second end of the pitch pivot link.

6. The work machine, as set forth in claim 1, wherein a swing bearing is interposed between the upper tilt frame and the working frame.

7. The work machine, as set forth in claim 1, wherein the roll support member comprises a fixed length structure.

8. The work machine, as set forth in claim 1, wherein the roll support member comprises a hydraulic cylinder.

9. A tilt mechanism, comprising:

a support tilt frame;

a center tilt frame supported by the support tilt frame;

an upper tilt frame supported by the center tilt frame; and a coupling mechanism having a pitch pivoting joint connecting the support tilt frame and the center tilt frame, a roll pivoting joint connecting the center tilt frame and the upper tilt frame, a pitch pivot link having a first end, a second end, and a third portion pivotally mounted to the support tilt frame, a roll support member having a first section and a second section, the first section of the roll support member being pivotally attached to the second end and the second section of the roll support member being pivotally attached to the upper tilt frame, and a pitch support member having a first portion and a second portion, which are respectively pivotally attached to the first end and to the support tilt frame, the coupling mechanism defining a multiaxis pivot point between the support tilt frame and the upper tilt frame.

10. The tilt mechanism as set forth in claim 9, wherein at least one of the pitch support member and the roll support member comprises a hydraulic cylinder.

11. The tilt mechanism as set forth in claim 9, wherein a pitch axis extends through the pitch pivoting joint such that extension or retraction of the pitch support member causes the pitch pivot link to rotate about the third portion and cause the roll support member to move longitudinally, thus pivoting the upper tilt frame about the pitch axis.

12. The tilt mechanism as set forth in claim 11, wherein a roll axis extends through the roll pivoting joint such that extension or retraction of the pitch support member or the roll support member causes the pitch pivot link to rotate about the third portion and the roll support member to move longitudinally, thus pivoting the upper tilt frame about the roll axis.

* * * * *

UNITED STATES PATENT AND TRADEMARK OFFICE

CERTIFICATE OF CORRECTION

PATENT NO. : 6,343,799 B1
DATED : February 5, 2002
INVENTOR(S) : William J. Moyer It is certified that error appears in the above-identified patent and that said Letters Patent is hereby corrected as shown below:

Title page,
Please correct the title to read as follows:
-- TILT MECHANISM FOR A WORK MACHINE --
Please correct the *Attorney, Agent, or Firm* to read as follows:
-- Liza J. Meyers --

Signed and Sealed this

Third Day of September, 2002

*Attest:*

JAMES E. ROGAN

*Attesting Officer* *Director of the United States Patent and Trademark Office*